(12) United States Patent
Li et al.

(10) Patent No.: US 11,927,788 B1
(45) Date of Patent: Mar. 12, 2024

(54) LIGHT GUIDE MODULE INCLUDING THICK PORTION AND THIN PORTION

(71) Applicant: Primax Electronics Ltd., Taipei (TW)

(72) Inventors: Chia-Ming Li, Taipei (TW); Hui-Ling Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 18/132,217

(22) Filed: Apr. 7, 2023

(30) Foreign Application Priority Data

Mar. 15, 2023 (TW) .................................. 112109630

(51) Int. Cl.
*F21V 8/00* (2006.01)

(52) U.S. Cl.
CPC ........... *G02B 6/002* (2013.01); *G02B 6/0055* (2013.01); *G02B 6/0073* (2013.01); *G02B 6/0088* (2013.01); *G02B 6/009* (2013.01); *G02B 6/0091* (2013.01)

(58) Field of Classification Search
CPC .... G02B 6/002; G02B 6/0021; G02B 6/0055; G02B 6/0073; G02B 6/0088; G02B 6/009; G02B 6/0091
See application file for complete search history.

(56) References Cited

U.S. PATENT DOCUMENTS

| 2013/0063964 | A1* | 3/2013 | Meir | ...................... G02B 6/005 362/555 |
| 2015/0185395 | A1* | 7/2015 | Chang | .................. G02B 6/0021 362/609 |
| 2020/0335660 | A1* | 10/2020 | Kang | ................ G02F 1/133615 |
| 2020/0393611 | A1* | 12/2020 | Ryu | ...................... G02B 6/0061 |

FOREIGN PATENT DOCUMENTS

KR 20140078200 A * 6/2014

* cited by examiner

*Primary Examiner* — Keith G. Delahoussaye
(74) *Attorney, Agent, or Firm* — KIRTON McCONKIE; Evan R. Witt

(57) ABSTRACT

A light guide module is provided, which includes a circuit board, one or more light-emitting elements, a light guide plate, a first reflective layer and a second reflective layer. The one or more light-emitting elements are disposed on the circuit board. The light guide plate is located on the circuit board, in which the light guide plate has a thick portion and a thin portion connected to the thick portion, and the thin portion is located over the one or more light-emitting elements, and a side surface of the thick portion adjacent to the thin portion is laterally adjacent to the one or more light-emitting elements. The first reflective layer covers a side surface of the thick portion away from the thin portion. The second reflective layer covers an upper surface of the thick portion and an upper surface of the thin portion.

11 Claims, 3 Drawing Sheets

LIGHT GUIDE MODULE INCLUDING THICK PORTION AND THIN PORTION

FIELD OF THE INVENTION

The present disclosure relates to a light guide module.

BACKGROUND OF THE INVENTION

According to the current situation, the thinner appearance and power saving of the light guide module have gradually become the mainstream of development. However, in order to achieve good optical performance, such as providing good brightness and uniformity, there are still limits to reducing a size of the light guide module and reducing a number of light-emitting elements.

SUMMARY OF THE INVENTION

The present disclosure provides a light guide module, which includes a circuit board, one or more light-emitting elements, a light guide plate, a first reflective layer and a second reflective layer. The one or more light-emitting elements are disposed on the circuit board. The light guide plate is located on the circuit board, in which the light guide plate has a thick portion and a thin portion connected to the thick portion, and the thin portion is located over the one or more light-emitting elements, and a side surface of the thick portion adjacent to the thin portion is laterally adjacent to the one or more light-emitting elements. The first reflective layer covers a side surface of the thick portion away from the thin portion. The second reflective layer covers an upper surface of the thick portion and an upper surface of the thin portion.

In some embodiments, the one or more light-emitting elements are one or more side-view light-emitting elements.

In some embodiments, the one or more light-emitting elements are one or more top-view light-emitting elements.

In some embodiments, the upper surface of the thick portion and the upper surface of the thin portion are coplanar.

In some embodiments, the light guide plate is L-shaped.

In some embodiments, a side surface of the thin portion away from the thick portion is a light-exiting surface.

In some embodiments, a lower surface of the thin portion adjacent to the light-exiting surface is an inclined surface, and a thickness of the thin portion adjacent to the light-exiting surface is smaller than a thickness of the thin portion away from the light-exiting surface.

In some embodiments, the first reflective layer is a first reflective coating directly attached to the side surface of the thick portion away from the thin portion, and the second reflective layer is a second reflective coating directly attached to the upper surface of the thick portion and the upper surface of the thin portion.

In some embodiments, the first reflective layer and/or the second reflective layer includes ester and titanium dioxide.

In some embodiments, the light guide module further includes a first cover covering the first reflective layer and the second reflective layer.

In some embodiments, the light guide module further includes a second cover carrying the circuit board and in contact with at least a portion of a lower surface of the thin portion.

In some embodiments, the one or more light-emitting elements are the plurality of light-emitting elements, and a ratio of a maximum width of the light guide plate to a spacing between adjacent two of the light-emitting elements is less than or equal to 1.

BRIEF DESCRIPTION OF THE DRAWINGS

Aspects of the present disclosure are best understood from the following embodiments, read in conjunction with accompanying drawings. However, it should be understood that in accordance with common practice in the industry, various features have not necessarily been drawn to scale. Indeed, shapes of the various features may be suitably adjusted for clarity, and dimensions of the various features may be arbitrarily increased or decreased.

DETAIL DESCRIPTION OF THE PREFERRED EMBODIMENT

Figure 1:
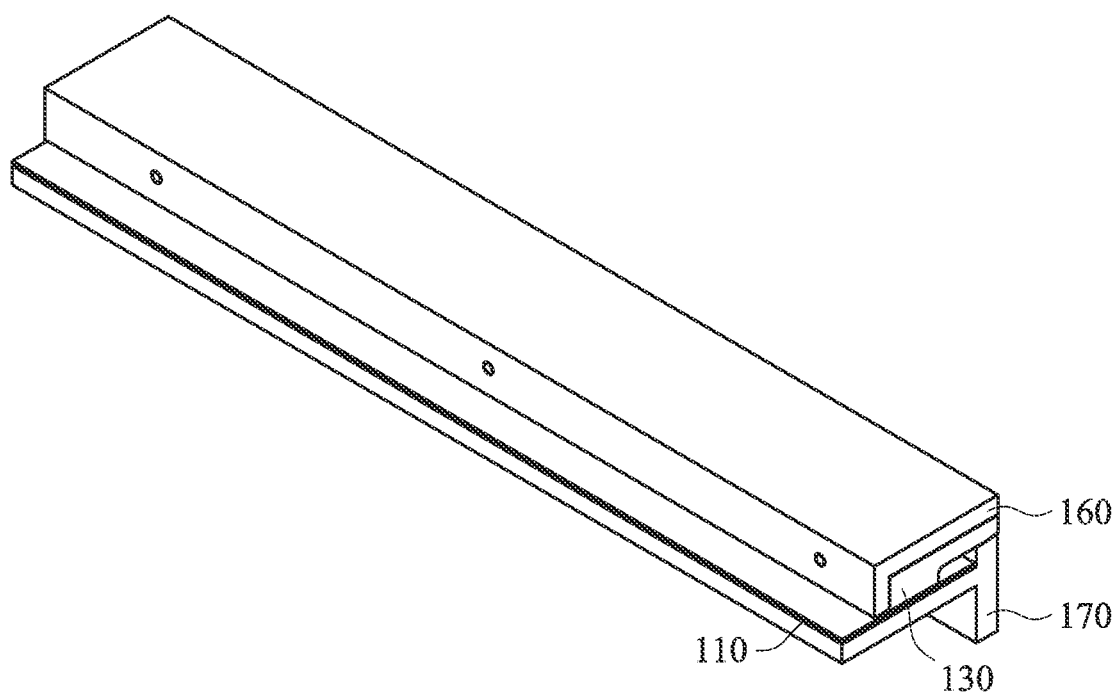
FIG. 1 is a perspective view of a light guide module according to an embodiment of the present invention.

The advantages and features of the present disclosure and the method for achieving the same will be described in more detail with reference to exemplary embodiments and accompanying drawings to make it easier to understand. However, the present disclosure can be implemented in different forms and should not be construed as being limited to the embodiments set forth herein. On the contrary, for those skilled in the art, the provided embodiments will make this disclosure more thorough, comprehensive and complete to convey the scope of the present disclosure.

The spatially relative terms in the text, such as "beneath" and "over", are used to facilitate the description of the relative relationship between one element or feature and another element or feature in the drawings. The true meaning of the spatially relative terms includes other orientations. For example, when the drawing is flipped up and down by 180 degrees, the relationship between the one element and the other element may change from "beneath" to "over." The spatially relative descriptions used herein should be interpreted the same.

As mentioned in background of the invention, in order to achieve good optical performance, such as providing good brightness and uniformity, there are still limits to reducing the size of the light guide module and reducing the number of light-emitting elements. Accordingly, the present invention provides a light guide module including a circuit board, one or more light-emitting elements, a light guide plate having a thick portion and a thin portion, a first reflective layer, and a second reflective layer, which still has good optical performance when a ratio of a width of the light guide plate to a spacing between adjacent two of the light-emitting elements is small, and thus it can meet the current requirements for thinner appearance and power saving of the light guide module. Various embodiments of the light guide module of the present invention will be described in detail below.

Figure 2:
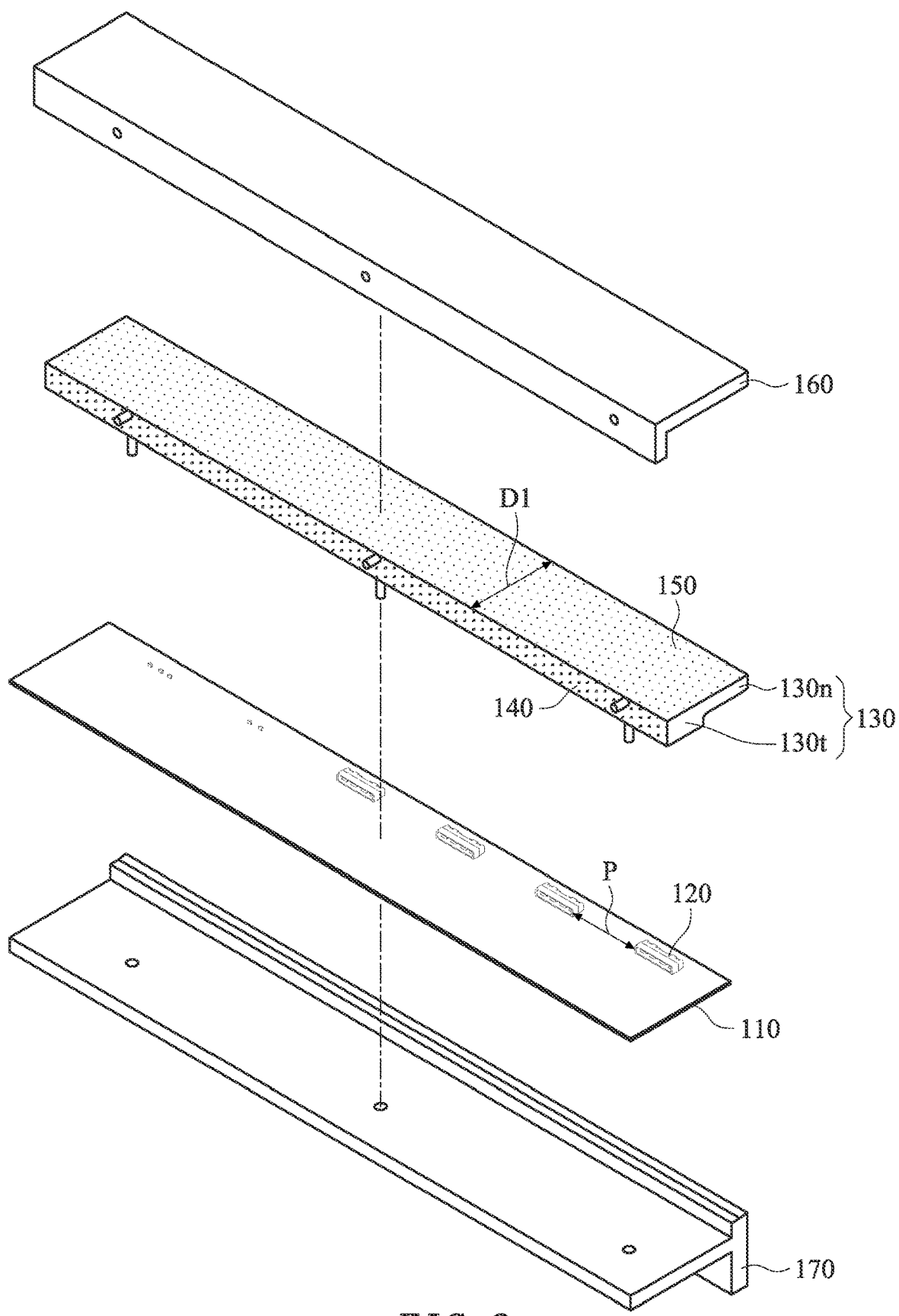
FIG. 2 is an exploded perspective view of the light guide module of FIG. 1.
Figure 3:
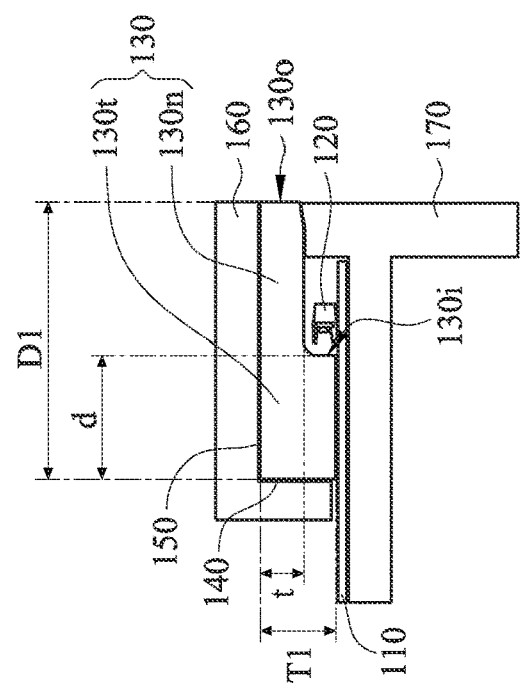
FIG. 3 is a schematic cross-sectional view of the light guide module of FIG. 1.

FIG. 1 is a perspective view of a light guide module according to an embodiment of the present invention. FIG. 2 is an exploded perspective view of the light guide module of FIG. 1. FIG. 3 is a schematic cross-sectional view of the light guide module of FIG. 1. As shown in FIGS. 1 to 3, the light guide module includes a circuit board 110, one or more light-emitting elements 120, a light guide plate 130, a first reflective layer 140 and a second reflective layer 150.

As shown in FIGS. 2 and 3, the one or more light-emitting elements 120 are disposed on the circuit board 110. In some embodiments, the one or more light-emitting elements 120 include side-view light-emitting element(s) and/or top-view light-emitting element(s), for example, the one or more light-emitting elements 120 is/are one or more side-view light-emitting elements or one or more top-view light-emitting elements. The light-emitting element 120 may be, for example, a light emitting diode (LED) unit, an organic light emitting diode (OLED) unit, a quantum dot light emitting diode (QLED) unit or an electroluminescence (EL) unit. In some embodiments, as shown in FIG. 2, the one or more light-emitting elements 120 are the plurality of light-emitting elements 120.

As shown in FIGS. 2 and 3, the light guide plate 130 is located on the circuit board 110. The light guide plate 130 has a thick portion 130t and a thin portion 130n connecting the thick portion 130t. The thin portion 130n is located over the one or more light-emitting elements 120. A side surface of the thick portion 130t adjacent to the thin portion 130n is laterally adjacent to the one or more light-emitting elements 120. In some embodiments, the light-emitting element 120 is a side-view light-emitting element, so the side surface of the thick portion 130t adjacent to the thin portion 130n may be called a light incident surface 130i. In some embodiments, the light guide plate is L-shaped. In some embodiments, an upper surface of the thick portion 130t and an upper surface of the thin portion 130n are coplanar.

The first reflective layer 140 covers a side surface of the thick portion 130t away from the thin portion 130n. The second reflective layer 150 covers the upper surface of the thick portion 130t and the upper surface of the thin portion 130n. In some embodiments, the upper surface of the thick portion 130t and the upper surface of the thin portion 130n are coplanar. The light emitted by the side-view light-emitting element enters the thick portion 130t of the light guide plate 130 from the light incident surface 130i, and is then reflected by the first reflective layer 140, and then directly exits from the light exit surface 130o or is reflected by the second reflective layer 150 and then exits from the light emitting surface 130o. The light emitted by the top-view light-emitting element enters the light guide plate 130, and is then reflected by the first reflective layer 140 and/or the second reflective layer 150, and then exits from the light-exiting surface 130o. In some embodiments, another reflective layer (not shown) covers a lower surface of the thin portion 130n to improve light utilization efficiency.

In some embodiments, the first reflective layer 140 is a first reflective coating, and the second reflective layer 150 is a second reflective coating. The first reflective layer 140 (first reflective coating) and the second reflective layer 150 (second reflective coating) may be made of the same material or different materials. In some embodiments, the first reflective coating is directly attached (e.g., formed by spraying or other suitable coating methods) to the side surface of the thick portion 130t away from the thin portion 130n, and the second reflective coating is directly attached (e.g., formed by spraying or other suitable coating methods) to the upper surface of the thick portion 130t and the upper surface of the thin portion 130n, so its optical reflection effect is better than optical reflection effect of a reflective sheet attached to a surface of the light guide plate through an adhesive layer. However, the present invention is not limited thereto, and the first reflective layer 140 and/or the second reflective layer 150 may be a reflective sheet. In some embodiments, the other reflective layer covering the lower surface of the thin portion 130n is a reflective sheet or a third reflective coating directly attached to the lower surface of the thin portion 130n.

In some embodiments, the first reflective layer and/or the second reflective layer includes ester and titanium dioxide. In some embodiments, the first reflective layer and/or the second reflective layer includes n-butyl acetate, ethyl acetate and titanium dioxide. In some embodiments, a weight percentage of ester is greater than or equal to a weight percentage of titanium dioxide. However, the present invention is not limited thereto, and the composition of the first reflective layer and/or the composition of the second reflective layer may be properly adjusted to have good optical reflection effect.

In some embodiments, the light guide module further includes a first cover 160 covering the first reflective layer 140 and the second reflective layer 150. In some embodiments, the light guide module further includes a second cover 170 carrying the circuit board 110 and in contact with at least a portion of the lower surface of the thin portion 130n. The light guide module shown in FIGS. 1 to 3 may be inverted and/or the shape of the first cover 160 and/or the shape of the second cover 170 may be appropriately changed during application to meet the requirements of the light guide module when used.

In some embodiments, the side surface of the thin portion 130n away from the thick portion 130t is the light-exiting surface 130o. In some embodiments, a lower surface of the thin portion 130n adjacent to the light-exiting surface 130o is an inclined surface, and a thickness of the thin portion 130n adjacent to the light-exiting surface 130o is smaller than a thickness of the thin portion 130n away from the light-exiting surface 130o. As such, when the human eye looks into the light guide module from outside of the light-exiting surface 130o, strong light inside or internal components (e.g., the light-emitting element 120 and/or its nearby components) will not be seen.

Please refer to FIG. 3, actual values of a maximum width D1 of the light guide plate 130 and a width d of the thick portion 130t and a ratio thereof may be adjusted appropriately to accommodate the light-emitting element 120 and make the light guide plate 130 have good optical performance. In some embodiments, the light-emitting element 120 is made as close to the light-incident surface 130i as possible and away from the light-exiting surface 130o, so as to avoid seeing strong light inside or the light-emitting element when the human eye looks into the light guide module from outside of the light-exiting surface 130o. In some embodiments, the ratio (D1/d) of the maximum width D1 of the light guide plate 130 to the width d of the thick portion 130t is greater than or equal to 2, but the present invention is not limited thereto. In some embodiments, the maximum width D1 of the miniaturized light guide plate 130 is between 4 mm and 10 mm, but the present invention is not limited thereto, and the maximum width D1 of the light guide plate 130 may be properly adjusted according to space configuration inside an electronic device, so the maximum width D1 of the light guide plate 130 is not limited to the embodiments exemplified above.

In some embodiments, when the light-emitting element 120 is the top-view light-emitting element, and the ratio (D1/d) is greater than or equal to 2, and the maximum width D1 is smaller (e.g., between 4 mm and 6 mm), the reflective sheet or the third reflective coating may be provided to cover the lower surface of the thin portion 130n to prevent from seeing the strong light inside or the top-view light-emitting element when the human eye looks into the light guide module from outside of the light-exiting surface 130o. In some embodiments, when the light-emitting element 120 is the top-view light-emitting element, and the ratio (D1/d) is greater than or equal to 2, and the maximum width D1 is larger (e.g., between 6 mm and 10 mm), the position of the top-view light-emitting element may be as close as possible to the thick portion 130t, so it may be considered not to dispose the reflective sheet or a third reflective coating.

Please refer to FIG. 3, actual values of a maximum thickness T1 of the light guide plate 130 (i.e., a maximum thickness of the thick portion 130t) and a thickness t of the thin portion 130n and a ratio thereof may be adjusted appropriately to accommodate the light-emitting element 120 and make the light guide plate 130 have good optical performance. In some embodiments, the ratio (T1/t) of the maximum thickness T1 of the light guide plate 130 to the thickness t of the thin portion 130n is greater than or equal to 1.75, but the present invention is not limited thereto. In some embodiments, the maximum thickness T1 of the miniaturized light guide plate 130 is between 1.5 mm and 2.0 mm, but the present invention is not limited thereto, and the maximum thickness T1 of the light guide plate 130 may be properly adjusted according to the space configuration inside the electronic device, so the maximum thickness T1 of the light guide plate 130 is not limited to the embodiments exemplified above.

It is worth noting that, in order to achieve better optical performance in existing light guide modules, the ratio of the width of the light guide plate to the spacing between the light-emitting elements is usually designed to be greater than 1. However, it results in that when the width of the light guide plate becomes smaller, the spacing between the light-emitting elements becomes very small and more light-emitting elements are required, which has disadvantages such as high power consumption and high cost; when the number of the light-emitting elements decreases and thus the spacing between the light-emitting elements increases, the width of the light guide plate becomes very large, which is not conducive to miniaturization of the light guide module. That is to say, it is difficult for the existing light guide modules to have the advantages of low power consumption, low cost and miniaturization simultaneously.

However, in some embodiments, as shown in FIGS. 2 and 3, the ratio (D1/P) of the maximum width D1 of the light guide plate 130 to the spacing P between adjacent two of the light-emitting elements 120 of the present invention is less than or equal to 1, or even less than or equal to 0.95, 0.9, 0.85, 0.8, 0.75 or 0.7, which still makes the light guide module have good average brightness and uniformity, and thus can have a smaller maximum width D1 of the light guide plate 130 and fewer light-emitting elements 120. Accordingly, the light guide module of the present invention have the advantages of low power consumption, low cost and miniaturization simultaneously.

The following examples are provided for illustration, but it should be noted that the following examples are not intended to limit the present invention.

Figure 4:
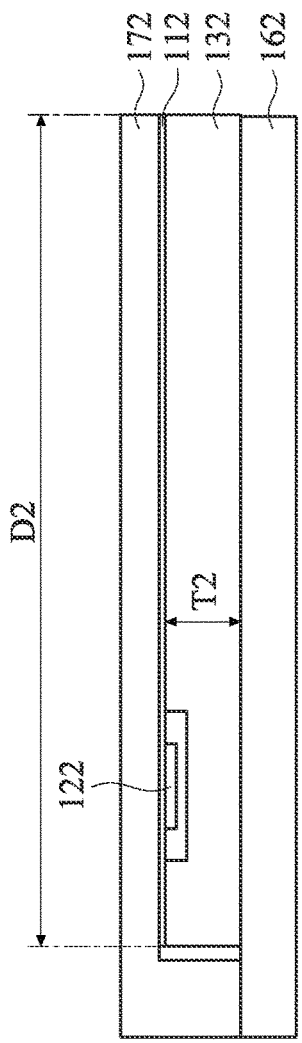
FIG. 4 is a schematic cross-sectional view of a light guide module according to a comparative example of the present invention.

FIG. 4 is a schematic cross-sectional view of a light guide module according to a comparative example of the present invention. As shown in FIG. 4, the light guide module includes a circuit board 112, a plurality of top-view light-emitting elements (one top-view light-emitting element 122 of which is shown in FIG. 4) and a light guide plate 132. The light guide plate 132 has a recess (not marked) configured to accommodate the top-view light-emitting element 122. The light guide module may further include a first cover 162 and a second cover 172. In one example, please refer to FIG. 4, a ratio of the maximum width D2 of the light guide plate 132 to a spacing between adjacent two of the top-view light-emitting elements is 1.2, and average brightness of the light guide module is 173.8 Nits, and uniformity thereof is 66%.

In one example, please refer to FIGS. 2 and 3, the ratio (D1/P) of the maximum width D1 of the light guide plate 130 to the spacing P between adjacent two of the side-view light-emitting elements 120 of the present invention is 0.8, and average brightness of the light guide module is 215.6 Nits, and uniformity thereof is 76%. In addition, please refer to FIGS. 3 and 4, a ratio of the maximum width D1 of the light guide plate 130 to the maximum width D2 of the light guide plate 132 is about 1:3, and the maximum thickness T1 of the light guide plate 130 is substantially the same as the maximum thickness T2 of the light guide plate 132.

As can be seen from the above, when the ratio (D1/P) of the maximum width D1 of the light guide plate 130 to the spacing P between adjacent two of the side-view light-emitting elements 120 of the light guide module of the example of the present invention is 0.8, and the maximum width D1 of the light guide plate 130 is greatly reduced, the light guide module exhibits better average brightness and uniformity.

However, the above are only the preferred embodiments of the present disclosure, and should not be used to limit the scope of implementation of the present disclosure, that is, simple equivalent changes and modifications made in accordance with claims and description of the present disclosure are still within the scope of the present disclosure. In addition, any embodiment of the present disclosure or claim does not need to achieve all the objectives or advantages disclosed in the present disclosure. In addition, the abstract and the title are not intended to limit the scope of claims of the present disclosure.

What is claimed is:

1. A light guide module, comprising:
    a circuit board;
    one or more light-emitting elements disposed on the circuit board;
    a light guide plate located on the circuit board, wherein the light guide plate has a thick portion and a thin portion connected to the thick portion, and the thin portion is located over the one or more light-emitting elements, and a side surface of the thick portion adjacent to the thin portion is laterally adjacent to the one or more light-emitting elements, wherein a side surface of the thin portion away from the thick portion is a light-exiting surface;
    a first reflective layer covering a side surface of the thick portion away from the thin portion; and
    a second reflective layer covering an upper surface of the thick portion and an upper surface of the thin portion.

2. The light guide module of claim 1, wherein the one or more light-emitting elements are one or more side-view light-emitting elements.

3. The light guide module of claim 1, wherein the one or more light-emitting elements are one or more top-view light-emitting elements.

4. The light guide module of claim 1, wherein the upper surface of the thick portion and the upper surface of the thin portion are coplanar.

5. The light guide module of claim 1, wherein the light guide plate is L-shaped.

6. The light guide module of claim 1, wherein a lower surface of the thin portion adjacent to the light-exiting surface is an inclined surface, and a thickness of the thin portion adjacent to the light-exiting surface is smaller than a thickness of the thin portion away from the light-exiting surface.

7. The light guide module of claim 1, wherein the first reflective layer is a first reflective coating directly attached to the side surface of the thick portion away from the thin portion, and the second reflective layer is a second reflective coating directly attached to the upper surface of the thick portion and the upper surface of the thin portion.

8. The light guide module of claim 1, wherein the first reflective layer and/or the second reflective layer comprises ester and titanium dioxide.

9. The light guide module of claim 1, further comprising a first cover covering the first reflective layer and the second reflective layer.

10. The light guide module of claim 1, further comprising a second cover carrying the circuit board and in contact with at least a portion of a lower surface of the thin portion.

11. The light guide module of claim 1, wherein the one or more light-emitting elements are a plurality of light-emitting elements, and a ratio of a maximum width of the light guide plate to a spacing between adjacent two of the light-emitting elements is less than or equal to 1.

\* \* \* \* \*